W. D. KYLE
March 31, 1931. FUSE BOX Re. 18,020
Original Filed July 16, 1929 3 Sheets-Sheet 1
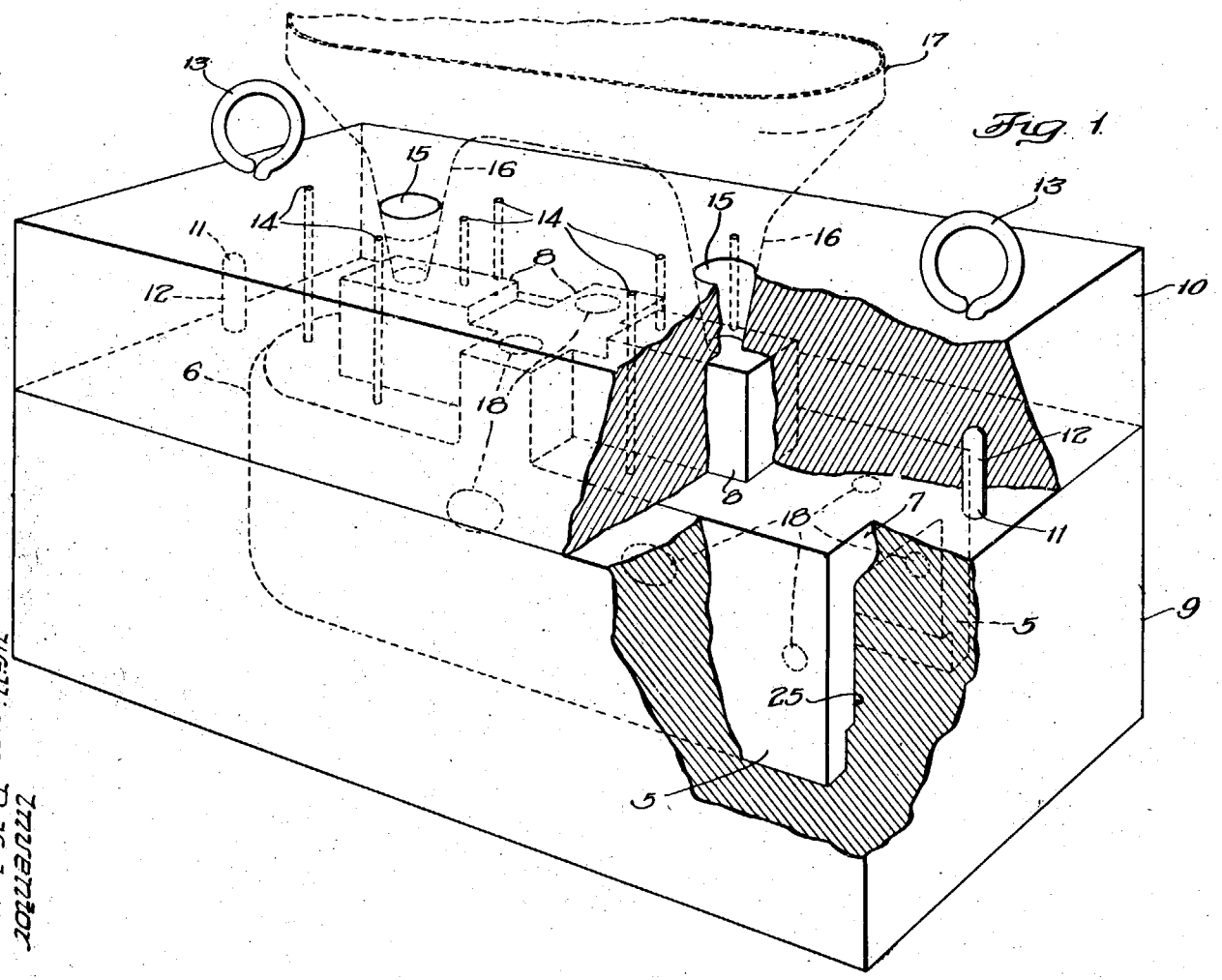
Witness
William A. Kilroy
Inventor
William D. Kyle
By Brown, Jackson, Boettcher & Dienner
Attys

W. D. KYLE

March 31, 1931. FUSE BOX Re. 18,020

Original Filed July 16, 1929 3 Sheets-Sheet 2

Witness
William P. Kilroy

Inventor
William D. Kyle
By Brown, Jackson, Boettcher & Dienner
Attys.

W. D. KYLE

FUSE BOX

March 31, 1931.

Re. 18,020

Original Filed July 16, 1929 3 Sheets-Sheet 3

Witness
William P. Kilroy

Inventor
William D. Kyle
By Brown, Jackson, Boettcher & Dienner
Attys.

Reissued Mar. 31, 1931 Re. 18,020

UNITED STATES PATENT OFFICE

WILLIAM D. KYLE, OF MILWAUKEE, WISCONSIN, ASSIGNOR TO LINE MATERIAL COMPANY, OF SOUTH MILWAUKEE, WISCONSIN, A CORPORATION OF DELAWARE

FUSE BOX

Original No. 1,781,876, dated November 18, 1930, Serial No. 378,785, filed July 16, 1929. Application for reissue filed February 18, 1931. Serial No. 516,703.

This invention relates to fuse boxes, and the present application is a continuation in part of my copending application Serial No. 83,563, filed January 25, 1926.

As pointed out in United States Letters Patent No. 1,557,707, issued to me on October 20, 1925, experience has proven that dry process porcelain is not satisfactory for fuse boxes, especially where high voltages are handled. The dielectric strength of dry process porcelain is relatively low. Dry process porcelain is relatively porous and the walls of the box have to be relatively thick. Liberal spacing of the side walls of the box from the contacts has also been necessary. As a result, boxes of dry process porcelain have been bulky and cumbersome and in addition their insulating properties have not been suitable.

After such a box has been in service the current will leak through the dry process walls to the crossarms or other support. Leakage and burning of the crossarms results and a great, insidious danger has been prevented. The linemen or other workmen have been subject to danger at all times where such boxes have been employed. Dry process porcelain boxes have, therefore, been of little use with high voltages, and their use, has been confined to lower voltages.

Wet process porcelain, however, affords much greater protection, particularly under high voltages. Its dielectric strength is much higher. It is less porous and is suitable for use with safety to linemen and workmen under much higher voltages. Due to its greater moisture content and greater density, which greater density materially retards the escape of the moisture in firing, it has been found, however, that wet process porcelain is subjected to much higher internal stresses in firing than is dry process porcelain, and that it will tend to warp or distort. Prior to my present invention it has been generally considered impossible to construct an irregular shaped article of wet process porcelain, particularly a fuse box having an open end and with the side walls terminating and separated and thereby freed at the opening.

Heretofore it has been deemed possible to form only symmetrical articles or articles which are uniform or regular in section from wet process porcelain. To avoid the accepted unsuitability of wet process porcelain for an open end fuse box and at the same time to obtain a measure of the advantages of wet process porcelain my prior Patent No. 1,557,707 provides substantially round contact carrying members of wet process porcelain embodied as separate inserts in a fuse box in which the body or housing thereof is formed of dry process porcelain. These inserts make the construction more complicated and increase the cost, and while in a measure they increase the insulation from the contacts to the crossarm, the box still has the low and unsatisfactory insulation properties in the walls thereof. Where separate inserts of this sort are disposed along the back wall, for example, the insulation of the side walls is in no wise improved thereby, and even that improvement, which these separate inserts provide, is merely a localized improvement and without any improvement in the insulation of the walls of the box other than at the wet process inserts. Where there are side wall openings for the entry of the line conductors, separate wet process porcelain inserts might possibly be provided at these openings, but this would further increase the cost and would further complicate the structure. In addition the improvement in insulation would again be merely a localized improvement.

With the foregoing disadvantages in mind, and particularly the shortcomings and limited utility of dry process boxes and the increased cost and relatively limited improvement in insulating qualities of dry process boxes with wet process contact carrying inserts, it is an object of the present invention to provide as an article of manufacture a fuse box comprising a unitary one-piece body of wet process porcelain having a wet process porcelain base or back wall and unitary wet process porcelain side and top walls. The box has an open bottom and the side walls are continuous at the top through the top wall and terminate and are separated and freed at the bottom of the box adjacent the opposite sides of the bottom opening.

The side walls preferably have openings formed by transverse perforations and the wet process side walls better enables the provision of such openings. The wet process side, top and back walls prevent electrical leakage through the side and top walls as well as through the back wall, and this leakage is prevented without requiring the embodiment of separate inserts, or the like. The elimination of these inserts reduces the cost, and, by the present invention, the side and top walls may be made thinner and brought closer to the contacts. This reduces the bulk or cumbersomeness of the box, saving space and porcelain.

In addition the improvement in insulation is not merely localized around the box adjacent one wall of the box but is extended over the entire unitary body of the box with a higher dielectric strength in all directions than can be obtained with a dry process box with wet process inserts.

The present invention provides a fuse box which is adapted for use with high voltages without electrical leakage and without danger.

The invention is illustrated in the accompanying drawings, in which:

Figure 1 is a perspective view of a mold with a completed fuse box therein, prior to its withdrawal, portions of the mold being broken away and in section to more clearly illustrate the invention;

Figure 3:
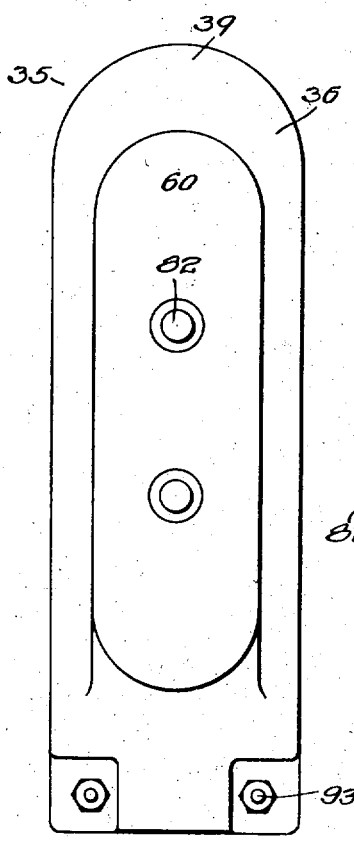
Figure 3 is a back or rear elevational view of the box shown in Figure 2.
Figure 2:
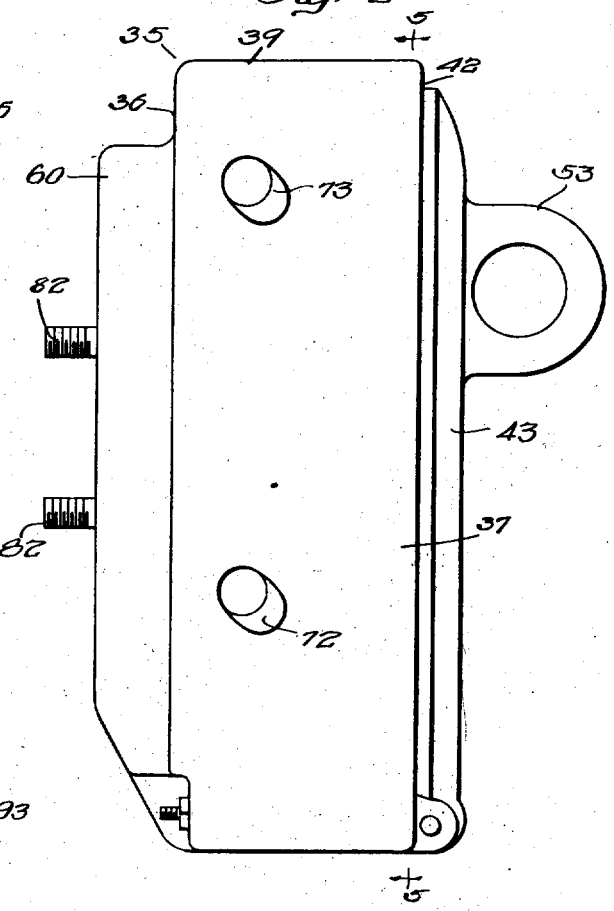
Figure 2 is a side elevational view of another box embodying the present invention.
Figure 4:
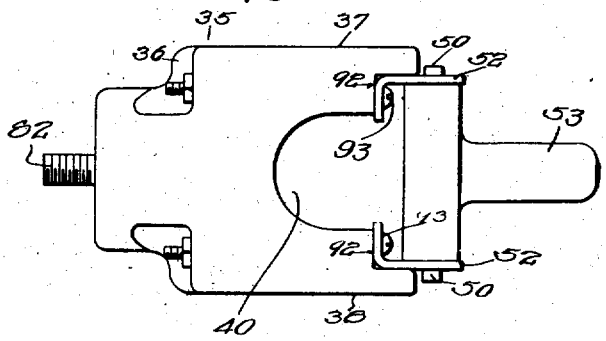
Figure 4 is a bottom or lower end view of the box shown in Figures 2 and 3.

The fuse box illustrated in Figure 1 consists of side walls 5, end wall 6 and a rear wall 7, the open front of the box being closed by a removable door or cover, not shown, and a fuse, not shown, being securable in the box to bridge terminal members, not shown, mounted therein in any suitable manner.

The box shown in Figure 1 has enlargements or projections 8 on its rear wall to mount a suitable support engaging member, not shown, which is secured thereto by means of bolts or other fasteners, not shown, set within the openings 18 therein.

In Figure 1 of the accompanying drawings I have illustrated the manner of producing of wet process porcelain and in one piece a unitary fuse box having an end or bottom opening 25 interrupting the continuity of the side walls and presenting an irregular shape which, prior to my present invention, has been deemed impossible to form of wet process porcelain.

Two mating mold members 9 and 10 are provided, having their interiors shaped to conform with the interior and exterior outlines of the box it is desired to form and the sections are guided into proper registering position and there held by two or more dowel pins 11 carried by one mold section and passed into recesses 12 in the other mold section, rings or other members 13 being connected with the upper mold section to facilitate its securement on or removal from the lower section. The mold sections are formed of plaster of Paris or other material having the ability to absorb moisture, and the top section has a plurality of vent openings 14 therein communicating with the space in which the fuse box is to be formed. Two or more large inlet openings 15 are formed in the upper mold section, preferably at the highest points of the form and the discharge spouts 16 of a funnel or trough arrangement 17 are connected as illustrated.

In operation the porcelain clay is held suspended in a suitable fluid, preferably water, and the clay suspended in the fluid is introduced into the mold through the funnel or trough arrangement 17, the trough 17 being kept filled to assure the deposit of the clay in the mold as the moisture content of the mixture is absorbed by the material of which the mold sections are formed. After a period of approximately twenty-four to forty-eight hours, a completed fuse box will have been formed in the mold, the body of which is sufficiently stiff to permit its removal, the normal shrinkage of the clay from the plaster of Paris molds greatly facilitating its ready removal.

The fuse box, after withdrawal from the mold, is then drilled preferably after the piece has been thoroughly dried to provide whatever openings 18 are desired, when it is then treated by being baked or glazed, if desired, in the customary manner. The location of the plurality of openings or recesses 18 is illustrated in dotted lines, although it is readily apparent that these openings or recesses may be any place in the box and of any shape and design. After the box has been properly cured and finished, the various terminal members and parts are secured thereto by bolts or other fasteners cemented in the openings or recesses formed therein. In addition to the advantages already pointed out, the unitary wet process box of the present invention looks better and provides surfaces which are smoother and which will take a better glaze.

From the foregoing, it will be readily apparent to those skilled in the art to which this invention appertains, that I provide a novel and improved fuse box formed entirely of wet process porcelain with the advantages already pointed out.

In the embodiment of Figures 2 to 8, inclusive, the fuse box is designated in its entirety at 35. This box is again of irregular shape and comprises a back or rear base wall 36, side walls 37 and 38, closed and continuous or connected at the top by the top wall 39 and interrupted and separated at the bottom opening 40. The base wall 36, side walls 37 and 38 and top wall 39 constitute a unitary wet process porcelain body.

The side walls 37 and 38, while integrally connected and, therefore, continuous around the top through the top wall 39, have their lower ends terminating and free at the opposite sides of the opening 40. This freeing of the lower ends of the side walls removes the continuity of these walls and makes the box of an irregular shape, which the art has, prior to my present invention, considered impossible to produce of wet process porcelain.

The open front 42 of the box 35 is closed by a cover 43 to the inner face of which is secured a renewable fuse member 44, shown as of the expulsion type, although this may vary. The fuse member 44 provides a movable bridging member having a terminal 45 at its lower end and a terminal 46 at its upper end. The terminal 46 is gripped by a spring contact jaw member 47 fastened to the inner surface of the cover 43 and making electrical contact with the terminal 46. A U-shaped contact 48 secured to the inner surface of the cover 43 in nested relation with the contact jaw member 47 embraces the member 47 with the legs thereof contacting with the upper terminal 46 of the fuse through the member 47.

The cover 43 is hinged at its lower end by a pivot stud 50 carried by the cover 43 and pivotally engaged in openings 51 in the bracket arms 52 secured to the bottom of the box adjacent the bottom opening 40. The upper end of the cover 43 is provided externally with a manipulating eye or ring 53 for opening or closing the cover.

Closing of the cover 43 engages the fuse contact 45 and the sides of the contact 48 between and electrically with stationary spring contact jaw members 54 and 55 mounted within the box, thereby bridging the contacts 54 and 55 by the fuse 44 and placing the fuse electrically in circuit across said contacts 54 and 55. The contact jaws 54 and 55 are of generally U-shaped formation with their bases mechanically secured to terminal members 57 and 58 by screws 70, and each in electrical contact with its associated terminal. The rear wall 36 is thickened rearwardly at 60 and opening into this rearwardly thickened portion from the inner surface 61 of the rear wall 36 are a pair of cementing recesses 62, one for each of the terminals 57 and 58 and aligned vertically on the vertical median line of the box. Each of the terminals 57 and 58 has an integral cementing stud 63, which studs 63 are preferably provided with roughened surfaces and are cemented at 64 in the cementing recesses 62.

Each terminal 57 and 58 has a transverse opening 68 for receiving the bared end of the line wire from either side of the terminal and screws 69 are provided for binding the inserted ends of the wires securely in place.

Figure 5:
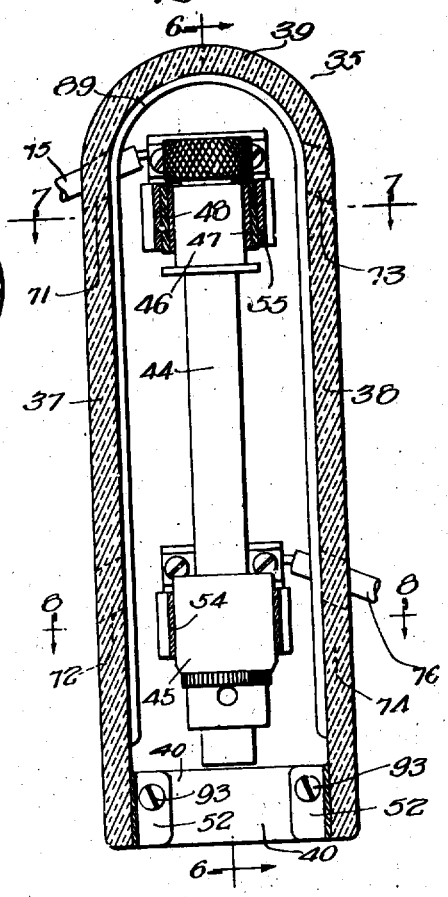
Figure 5 is a vertical section taken on the line 5—5 of Figure 2.
Figure 7:
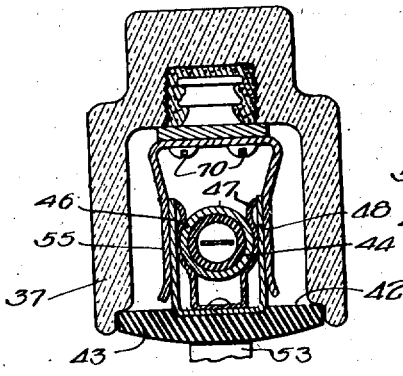
Figure 7 is a horizontal section taken on the line 7—7 of Figure 5.
Figure 8:
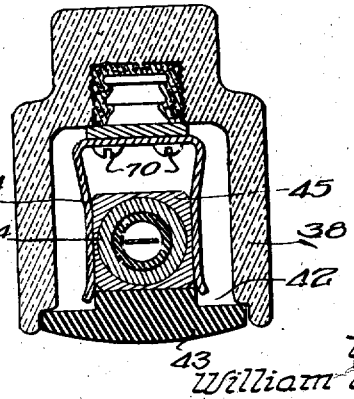
Figure 8 is a horizontal section taken on the line 8—8 of Figure 5.

The side wall 37 of the box has an upper opening 71 leading in to the upper terminal 58 and a lower opening 72 leading in to the lower terminal 57. The opposite side wall 38 has an upper opening 73 leading in to the opposite side of the terminal 58 and a lower opening 74 leading in to the opposite side of the lower terminal 57. These openings preferably have well rounded edges to permit leading in insulated line conductors, not only through either side but from any angular position, without possibility of cutting or injuring the insulation. In Figure 5, one line conductor 75 is led in through the top opening 71 in one side of the box and electrically and mechanically connected with the terminal 58 and the other line conductor 76 is led in through the bottom opening in the opposite side of the box and similarly connected with the terminal 57.

The rear wall of the box is provided with a pair of cementing recesses 80 opening inwardly from the rear surface 81 and mounting studs 82 are suitably cemented at 83 in these recesses. The rearwardly projecting ends of the studs 82 are threaded to be engaged by nuts 84 for fastening the device to a mounting bracket shown more or less illustratively at 85, or to any other suitable support.

Figure 6:
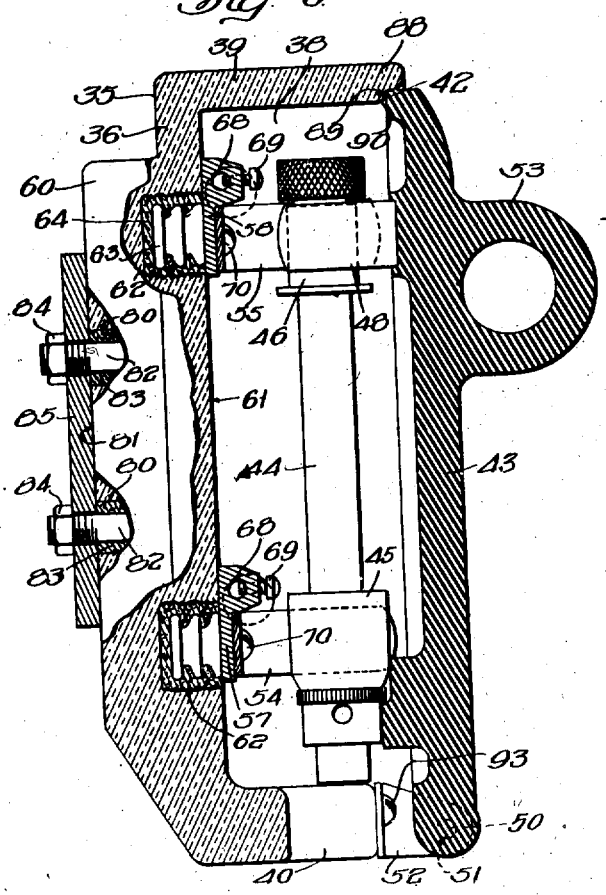
Figure 6 is a vertical section taken on the line 6—6 of Figure 5, the fuse member and a fragment of the box being shown in elevation.

Obviously, when the cover 43 is closed and the fuse 44 is in bridging relation across the contacts 54 and 55, the lower end of the fuse is directed downwardly toward the opening 40 and is disposed substantially centrally thereof. The free front edge of the unitary side and end wall structure has a marginal flange 88 into which the periphery of the cover 43 is adapted to fit when the cover is closed, as shown in Figure 6. In addition this flange 88 provides an internal outwardly directed shoulder 89 for cooperating with the inner marginal edge 90 of the cover 43 in the closed position thereof. In this manner the cover 43 provides a relatively tight closure for the open front 42 of the box. The brackets 52 to which the covers are hinged are shown as of angular formation fitting in angular recesses 92 and suitably secured by screws 93 to the wet process porcelain body of the box at the sides of the opening 40.

As in the preceding embodiment, the fuse box of Figures 2 to 8, inclusive, comprises a unitary one-piece body of wet process porcelain of irregular shape having a wet process porcelain base or back 35, 60, and unitary wet process side and top walls 37, 38 and 39 all formed in one-piece. The bottom opening 40 interrupts the continuity of the side walls 37 and 38 at the bottom of the box and separates and frees the lower ends of the side walls and the upper ends of the side walls are continuous and connected through the top wall 39.

By means of this unitary wet process body the dielectric strength of the box is much higher, not only along the back 36, 60 but along the side walls 37 and 38 and particularly between the openings 71, 72, 73 and 74. This increases the dielectric strength between the line conductors 75 and 76 as well as between the terminals 57 and 58, and all of this increased dielectric strength and greater protection, particularly under high voltages, is obtained without the use of a round or regular wet process insert in a dry process box. The insulation is materially increased over that provided by wet process porcelain contact carrying members in a dry process porcelain box because the improved insulation is provided through the entire wall structure and in every direction. Electrical leakage is prevented not only through the back but through the sides of the box and the walls may all be made thinner and brought closer to the contacts. I find that the present box will also take a better glaze and that smoother and more uniform surfaces are provided and that the walls are less porous. The box stands up much better under service and is not disintegrated and all insidious danger is eliminated. I find that where the walls of dry process boxes have heretofore been punctured that the walls of the present box are not punctured.

The wet process structure also better enables the provision of the opening 71, 72, 73 and 74 and in spite of the greater moisture content and greater density together with the greater internal stresses in firing and cooling and the tendency to bowing in or out, or other distortion, particularly due to the open-ended irregular formation and I have provided a box of this formation which is at the same time of unitary form and of wet process porcelain throughout with the advantages which have been pointed out.

I do not intend to be limited to the precise details shown or described.

I claim:

1. A device of the class described comprising a fuse box adapted to be exposed to the weather for housing a high voltage fuse and consisting of the combination of a unitary body member comprising a back wall member from which extends forwardly an integral rim defining substantially parallel sidewalls and a top wall leaving the front and bottom open, said back member and rim being formed as an integral unitary piece of dense wet process porcelain the same being throughout completely impervious to moisture and to metallic vapors generated by the blowing of the fuse, and being non-porous throughout and of very high dielectric strength, a movable cover member loosely fitting within the front opening, the body member having an external recess and there being secured therein a supporting member to mount the fuse box in such position that the back wall is substantially vertical, the inside of the body member having a pair of recesses and there being secured in said latter recesses a pair of contact supports, and an expulsion fuse mounted in the box and connected to said contact supports having an opening for the expulsion of metal vapors upon blowing of the fuse out through the bottom opening of the box, said sidewalls having perforations therethrough for the leading in of conductors to the contact supports in the box.

2. A device of the class described comprising a fuse box adapted to be exposed to the weather for housing a high voltage fuse and consisting of the combination of a unitary body member comprising a back wall member from which extends forwardly an integral rim defining substantially parallel side walls and a top wall, leaving the front and bottom open, said back member and rim being formed as a unitary piece of dense wet process porcelain being throughout impervious to moisture and to metallic vapors generated by the blowing of the fuse, and being non-porous throughout and of very high dielectric strength, a movable cover member for the front opening, the body member being provided with a supporting member for mounting the fuse box in such position that the back wall is substantially vertical, the inside of the body member being provided with means for anchoring a pair of contacts therein, and a fuse so mounted in the box that upon blowing of the fuse the metal vapors are directed through the bottom opening of the box, said side walls having perforations therethrough for the leading in of conductors to the contact supports in the box.

In witness whereof, I hereunto subscribe my name this 14th day of February, 1931.

WILLIAM D. KYLE.